No. 859,815. PATENTED JULY 9, 1907.
H. M. KELLEY.
VEHICLE TOP.
APPLICATION FILED FEB. 26, 1907.

2 SHEETS—SHEET 2.

Harral M. Kelley,
INVENTOR.

WITNESSES:

By C. A. Snow & Co.
ATTORNEYS

UNITED STATES PATENT OFFICE.

HARRAL M. KELLEY, OF CLARKSVILLE, TEXAS.

VEHICLE-TOP.

No. 859,815.   Specification of Letters Patent.   Patented July 9, 1907.

Application filed February 26, 1907. Serial No. 359,342.

*To all whom it may concern:*

Be it known that I, HARRAL M. KELLEY, a citizen of the United States, residing at Clarksville, in the county of Red River and State of Texas, have invented a new and useful Vehicle-Top, of which the following is a specification.

The present invention relates to improvements in vehicle tops, of the type embodying a set of bows and a covering of flexible material, such as canvas, and it has for its object to provide a vehicle top of improved construction embodying bows varying progressively in size to enable them to fit one within the other and having standards or legs pivotally attached thereto to enable them to be folded to reduce the height of the bows, the bows of the attached canvas when folded in this way being adapted to serve as a seat rest or it may be closed within a correspondingly formed casing which provides a back rest for the seat.

To these and other ends, the invention consists in certain improvements, and combinations and arrangements of parts, all as will be hereinafter more fully described, the novel features being pointed out particularly in the claims at the end of the specification.

Figure 1:
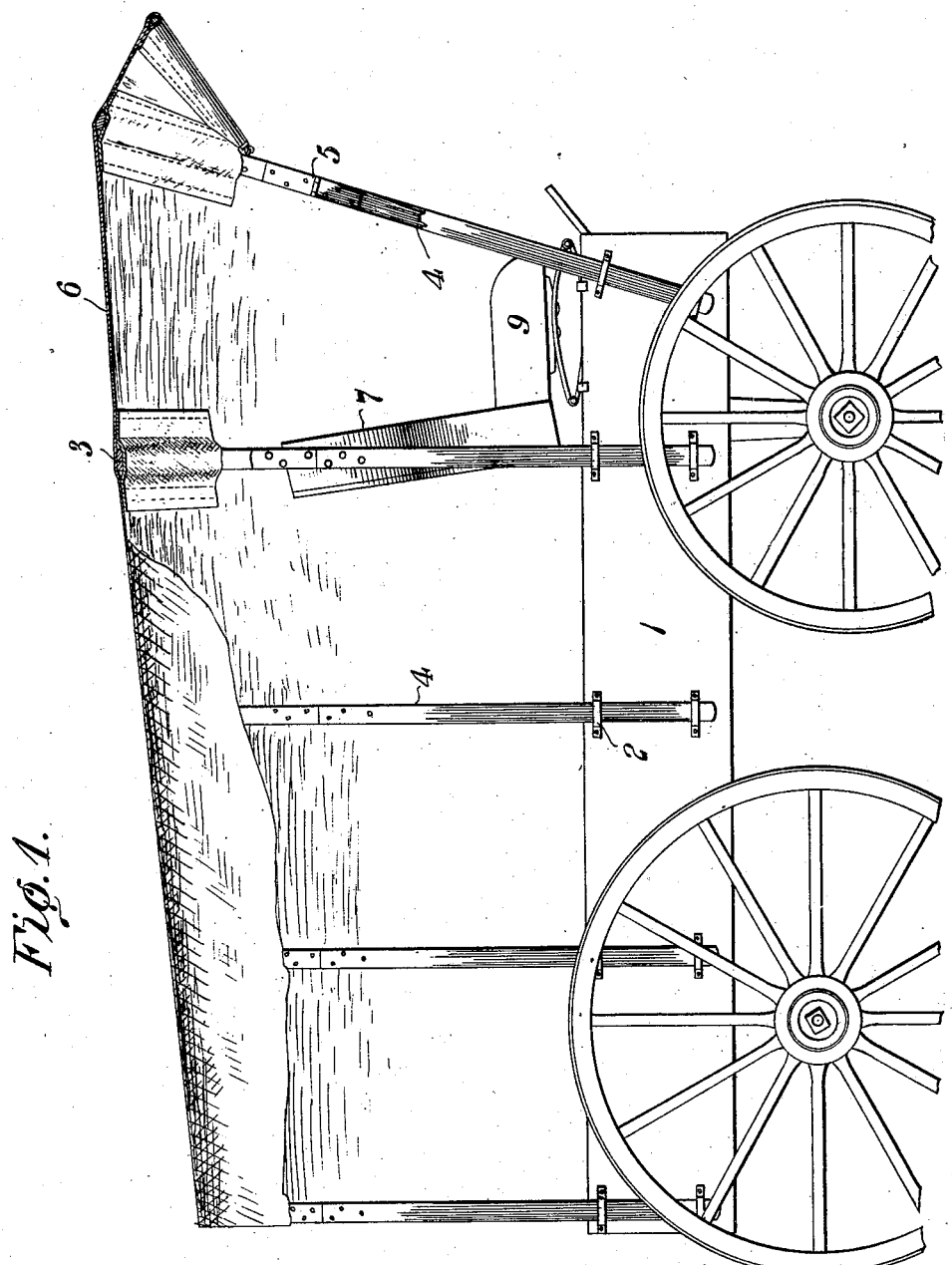
Figure 2:
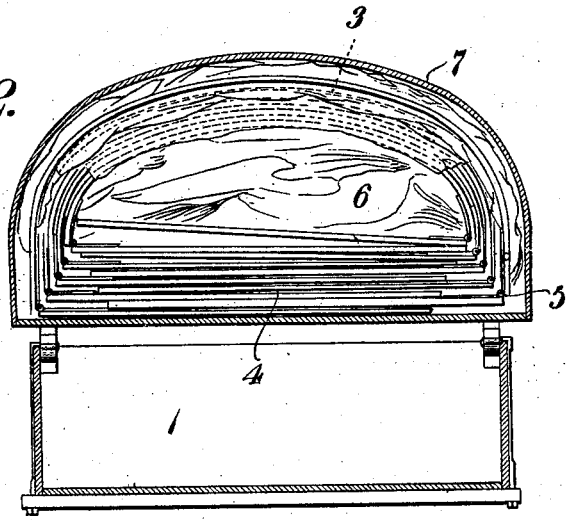
Figure 3:
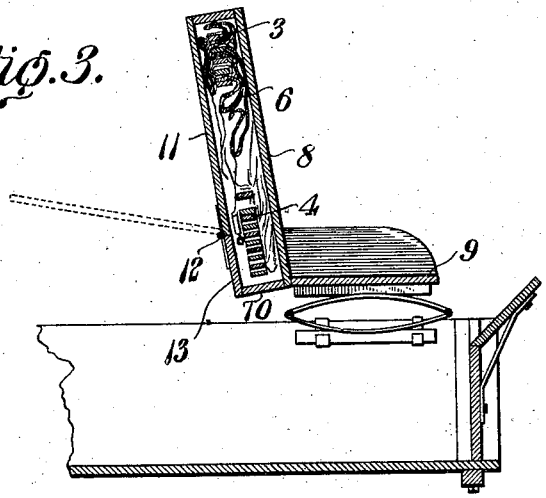

In the accompanying drawings, Figure 1 represents a side elevation of a wagon equipped with a top constructed in accordance with my invention. Fig. 2 represents a section on line 2—2 of Fig. 1. Fig. 3 represents a section on line 3—3 of Fig. 2.

Similar characters of reference designate corresponding parts throughout the several figures.

The invention in its present embodiment is adapted for use in connection with an ordinary wagon body 1 having a set of staples 2 adapted to receive detachably the lower ends of the uprights supporting the bows. The bows, in the present instance, each embody an upper curved portion 3 and a pair of uprights or legs 4, the latter being pivoted at their upper ends to the ends of the bows by means of suitable hinges 5 arranged on the inner sides of the uprights and the bows, respectively, to permit the relative infolding of the uprights, as shown in Fig. 2, and to limit the opening movement thereof so that when the lower ends of the legs are fitted into the staples on the wagon sides, the bows will be supported rigidly from lateral distortion. The bow at the front of the wagon is the largest of the set, the bow next to its rear being so much smaller as to fit within the bow in front of it, and the progressive grading of the sizes of the bows of the set is followed in order that those to the rear may fit within those in front of them, and this enables the bows to be so arranged after being detached from the wagon body that they will all occupy substantially the same plane. The legs or uprights of the bows are also correspondingly shortened on the bows toward the rear of the wagon body or cover in order that these legs may be interfolded and may all be included within the bow which is adapted to be fitted at the forward end of the wagon.

The canvas 6 is attached to these bows at the upper or curved portion thereof and is adapted to lie in folds as the bows are assembled, and the cover when removed from the wagon body and assembled in the compact form described is adapted to be fitted into a correspondingly formed casing 7, the latter, in the present instance, embodying a front portion 8 of segmental form, that is to say, of a form conforming approximately to the shape of the outer bow when in a folded position. This front portion is adapted to serve as a back or rest for the usual seat 9. The sides 10 are fitted in the rear of this front portion and the casing is closed by a door 11, the latter being hinged at 12 to the rear portion 13. The folded top, when inclosed within the casing thus provided, is effectually protected from dust and the weather and is invisible, although it is readily accessible, enabling it to be quickly removed from its casing and fitted to the wagon body in emergencies, and its compact form when folded enables it to be applied to a casing so small that when the latter is employed as a back rest for a seat it does not appear unduly conspicuous.

Of course, it will be understood that the casing may be otherwise suitably attached to the vehicle when it is applied to those wherein the seat is already provided with a back rest, and also, in folding the top, the cover may be interfolded with the bows, or it may be folded, as shown in Fig. 3, the sun shade or front extension of the bow folding about its ends as pivots against the adjacent bow, as shown, so that the top will be very compact when in folded condition. Moreover, it will be understood, of course, that the form shown and described is one embodiment only of the invention, and the construction and arrangement of the parts are capable of being modified to accommodate the appliance to different vehicles.

What is claimed is:—

1. A vehicle top embodying a cover, and a set of bows attached thereto having curved portions varying progressively in size from one end of the top to the other, and standards or legs pivotally attached to the curved portions and free to be folded inwardly and limited in their outward movement.

2. A vehicle top embodying a flexible cover, and a set of bows suitably attached thereto, said bows embodying upper curved portions varying progressively in diameter from one end of the top to the other and capable of fitting one within the other, and uprights or leg portions hinged to the curved portions of the bows and varying proportionately in length according to the diameter of the respective curved portions to which they are attached, said leg portions being adapted to be interfolded inwardly.

3. The combination with a vehicle body having a seat thereon, and a back or rest therefor, comprising a segmental casing, of a cover for the vehicle embodying a flexible covering and a set of bows attached thereto varying progressively in size and adapted to fit one within the other, the bows and cover fitting in said casing when collapsed.

4. The combination with a vehicle seat, and a back rest therefor embodying a segmental casing having its top curved to conform to the curvature of the bows and provided with a door at the rear for permitting access thereto, of a cover embodying a flexible covering, and a set of bows suitably attached thereto each bow embodying an upper curved portion, the curved portions of the different bows of the set varying progressively in diameter to permit them to fit one within the other, and legs having hinged connections with said curved portions for permitting them to be folded inwardly, the top when thus collapsed being adapted to fit into the said casing.

5. The combination with a flexible cover, and a set of bows suitably attached thereto each embodying an upper curved portion, the curved portions of the set of bows varying progressively in their diameters from the front to the rear of the top to permit them to be folded one within the other, and leg portions having hinged connections with the curved portions of their respective bows for permitting them to be folded inwardly, of a casing shaped to conform with the outline of the bows and leg portions when folded and adapted to inclose the latter.

In testimony that I claim the foregoing as my own, I have hereto affixed my signature in the presence of two witnesses.

HARRAL M. KELLEY.

Two witnesses:
J. N. BLAND,
OSCAR McBRIDE.